United States Patent Office 2,868,746
Patented Jan. 13, 1959

2,868,746

FURFURAL-ALCOHOL-THIOPHENE RESIN COMPOSITIONS

Raymond M. Frey, Milwaukee, Wis., assignor to McGraw-Edison Company, a corporation of Delaware No Drawing. Application November 4, 1955
Serial No. 545,109

8 Claims. (Cl. 260—23.5)

The present invention relates to insoluble, infusible, synthetic, polymeric and thermosetting resinous compositions, and especially relates to compositions incorporating a furan compound and a thiophene compound with or without the addition of tall oil.

Prior to my present application, I have discovered and disclosed in application Serial No. 340,281, filed March 4, 1953, now Patent No. 2,735,826, granted on February 21, 1956, that a basic furan resin composition may include, as a component, an unsaturated fatty acid or the natural occurring tall oil which contains substantial quantities of unsaturated fatty acids and rosin acids. I also have found, as disclosed in the above application, that tall oil or its components may be combined in a simple condensation reaction with various other furan compounds to provide thermosetting resins having excellent chemical and physical characteristics.

In the present application, it is an object to provide a method of preparing a furan resin by combining a furan compound such as furfuryl alcohol and thiophene together to provide thermosetting resins having uniformly strong textures, in addition to further provide a method of preparing furan resins from a combination of furfuryl alcohol, thiophene and tall oil.

It is another object of the present invention to provide as a new composition of matter, a resin prepared from a furan compound and thiophene with or without tall oil in combination therewith.

Furan resins have long been known to provide characteristics of exceptional physical strength and shock resistance, in addition to being superior in chemical resistance to alkalies, acids and ordinary solvents. These nonreactive reaction products are generally prepared by condensation of furfuryl alcohol with an acid and a subsequent neutralization with alkali. This reaction is very difficult to control, both in the laboratory and commercially, inasmuch as it is quite exothermic in nature and must be carefully watched to prevent danger to operators and neighboring equipment. In addition, furfuryl alcohol is quite expensive for use in thermosetting plastic compositions.

I have found that, by the addition of thiophene to a basic furfuryl alcohol condensation reaction in the presence of any of the well-known Lewis acid catalysts, will materially act to control the otherwise violent exothermic reaction, in addition to providing a composition which has substantially the same desirable characteristics of the well-known furfuryl alcohol polymerization.

There is also every indication to believe that thiophene combines chemically with the furan inasmuch as there is no indication of any material leaching out in the finally cured condensation product.

I have further found that tall oil may be added to the present thiophene-furan resin to act as a helpful extender and materially reduce the cost of the final resin composition without reducing the desired chemical and physical characteristics. The precise mechanics of reaction, in the addition of tall oil, are not clear at the present time, but it is known that there is a considerable amount of unsaturated components in the tall oil reacting to provide the resinous material. This is verified from the relatively high Iodine Number of tall oil, which ranges from 140 to 210.

It appears that the entire amount of tall oil and of the thiophene combined with the reaction product, inasmuch as there is no indication of the presence of side components after polymerization has taken place when proper proportions, less than an excess, are reacted together.

*Example 1*

(a) 60 gms. of furfuryl alcohol and 20 gms. of thiophene were added together at room temperature in the presence of about 2% by weight of diethyl sulfate as the catalyst. The mixture was heated on a water bath from room temperature to approximately 160° F., at which point an exothermic reaction took place. The exothermic reaction provided a temperature rise of approximately 50° F. On subsidence of the reaction, the mixture was then removed from the water bath and permitted to cool to a temperature of approximately 160° F. Heat was then applied to maintain the 160° F. temperature within plus or minus 5 degrees to permit polymerization to take place. The polymerization proceeded until the material thickened to the desired casting consistency. After casting into a suitable shape, the cast object was placed in an oven and maintained at a temperature of approximately 175–180° F. for final curing. The samples were uniform, shiny and strong.

(b) The ingredients were processed in substantially the identical manner set forth above, with the exception that 60 gms. of furfuryl alcohol were reacted with 40 gms. of thiophene. The resultant product was of a thermosetting nature and uniform in texture. No evidence of any of the chemicals leaching out was observed.

*Example 2*

(a) In the present example, the ingredients included 20 gms. of thiophene, 40 gms. of tall oil and 60 gms. of furfuryl alcohol mixed at room temperature in the presence of 2% diethyl sulfate as the catalyst. Again, the condensation reaction substantially as outlined above, in connection with Example 1, provided a thermosetting resin which was uniform and quite strong on final curing.

(b) The same ingredients were again reacted in the same manner as described above, except that a ratio of 2:2:3, by weight, of thiophene, tall oil and furfuryl alcohol, respectively, were reacted together in the presence of 2%, by weight, of diethyl sulfate. Again, the resinous composition, on final curing, was uniform and physically strong.

It will be apparent that the present invention has provided an improved furan resin and method for its preparation, wherein the addition of thiophene to the furan or the addition of thiophene plus tall oil to the furan contributes to an easily controlled reaction and a considerable cost reduction without in any way detrimentally affecting the excellent chemical and physical characteristics of the furan composition. The final composition may be used in any of the manners incident to the preparation of the well-known furan resins.

I claim:

1. The method of preparing a thermosetting resinous composition including the steps of admixing from 3:1 to 3:2 proportions by weight of furfuryl alcohol and thiophene respectively with diethyl sulfate, heating said mixture until an exothermic reaction takes place, on subsidence of said exothermic reaction polymerizing by heating, forming said mixture to a desired shape and finally curing said shaped mixture to a thermosetting state.

2. The method of preparing a thermosetting resinous composition including the steps of admixing from 3:1 to 3:2 proportions by weight of furfuryl alcohol and thiophene, tall oil and diethyl sulfate, heating said mixture until an exothermic reaction takes place, polymerizing by heating on subsidence of said exothermic reaction, forming said mixture to a desired shape and finally curing said shaped mixture to a thermosetting state.

3. The method of claim 1, wherein the ingredients are combined in a 3:1 ratio by weight of furfuryl alcohol and thiophene, respectively.

4. The method of claim 1, wherein the ingredients are combined in a 3:2 ratio by weight of furfuryl alcohol.

5. The method of claim 2, wherein the ingredients are combined in a 3:1:2 ratio by weight of furfuryl alcohol, thiophene and tall oil, respectively.

6. The method of claim 2, wherein the ingredients are combined in a 3:2:2 ratio by weight of furfuryl alcohol, thiophene and tall oil, respectively.

7. A product obtained by the process used in claim 1.

8. A product obtained by the process used in claim 2.

References Cited in the file of this patent

Moeller: Inorganic Chemistry, Wiley & Sons (1952), page 327.